United States Patent
Varma

(10) Patent No.: US 7,173,921 B1
(45) Date of Patent: Feb. 6, 2007

(54) PROTOCOL FOR ALLOCATING UPSTREAM SLOTS OVER A LINK IN A POINT-TO-MULTIPOINT COMMUNICATION SYSTEM

(75) Inventor: Subir Varma, San Jose, CA (US)

(73) Assignee: Aperto Networks, Inc., Milpitas, CA (US)

( * ) Notice: Subject to any disclaimer, the term of this patent is extended or adjusted under 35 U.S.C. 154(b) by 1579 days.

(21) Appl. No.: 09/689,243

(22) Filed: Oct. 11, 2000

(51) Int. Cl.
*H04J 3/00* (2006.01)
(52) U.S. Cl. .................. 370/337; 347/461; 347/462
(58) Field of Classification Search ............. 370/322, 370/337, 347, 348, 461, 462
See application file for complete search history.

(56) References Cited

U.S. PATENT DOCUMENTS

| | | | | |
|---|---|---|---|---|
| 5,563,883 A | * | 10/1996 | Cheng .................. | 370/449 |
| 5,648,958 A | * | 7/1997 | Counterman .......... | 370/458 |
| 5,657,325 A | | 8/1997 | Lou et al. | |
| 5,956,338 A | * | 9/1999 | Ghaibeh ................ | 370/236.2 |
| 6,006,017 A | * | 12/1999 | Joshi et al. ............ | 709/224 |
| 6,529,520 B1 | * | 3/2003 | Lee et al. .............. | 370/442 |

FOREIGN PATENT DOCUMENTS

| | | |
|---|---|---|
| DE | 197 28 469 A1 | 7/1999 |
| WO | WO 97/17768 A1 | 5/1997 |
| WO | WO 98/59523 A2 | 12/1998 |
| WO | WO 98/59523 A3 | 12/1998 |

(Continued)

OTHER PUBLICATIONS

Quigley, Thomas J., "Cable modem Standards for Advanced Quality of Service Deployments", Mar. 1999, http://www.broadband.gatech.edu/events/past/resident/DOCSIS1.pdf.*

(Continued)

*Primary Examiner*—Chau Nguyen
*Assistant Examiner*—Daniel K. Lam
(74) *Attorney, Agent, or Firm*—Swernofsky Law Group PC

(57) ABSTRACT

A system for controlling a contention state for a communication link between a base station controller and customer premises equipment in point-to-multipoint communication. The contention state is controlled using a state machine. The state machine includes a grant pending absent state in which a unicast request slot is maintained open for use by the customer premises equipment. During the grant pending absent state, the customer premises equipment sends no upstream data to the base station controller but can use the unicast request slot to request a data slot for sending upstream data to the base station controller. Preferably, the state machine further includes an idle state in which the customer premises equipment awaits arrival of data packets to send as upstream data to the base station controller. The state machine preferably further includes a deferring state in which the customer premises equipment defers contending for the data slot so as to avoid collisions with other customer premises equipment. The state machine also preferably includes a grant pending state in which the customer premises equipment awaits and receives grant of the data slot for sending upstream data to the base station controller and sends upstream data to the base station controller after grant of the data slot. In the grant pending state, the customer premises equipment preferably uses piggybacking to request grant of a next data slot while sending upstream data to the base station controller.

16 Claims, 2 Drawing Sheets

FOREIGN PATENT DOCUMENTS

| | | |
|---|---|---|
| WO | WO 99/01959 A2 | 1/1999 |
| WO | WO 99/14975 A2 | 3/1999 |
| WO | WO 99/14975 A3 | 3/1999 |
| WO | WO 99/23844 A2 | 5/1999 |
| WO | WO 99/23844 A3 | 5/1999 |
| WO | WO 99/44341 A1 | 9/1999 |
| WO | WO 01/50633 A1 | 7/2001 |
| WO | WO 01/50669 A1 | 7/2001 |

OTHER PUBLICATIONS

Seyhan Civanlar and Bharat T. Doshi. "Self-Healing in Wideband Packet Networks". IEEE Network vol. 4 (1990) Jan., No. 1, New York, pp. 35-39. XP 000113853.

* cited by examiner

PROTOCOL FOR ALLOCATING UPSTREAM SLOTS OVER A LINK IN A POINT-TO-MULTIPOINT COMMUNICATION SYSTEM

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention relates to point-to-multipoint communication. In particular, the invention relates to control of contention for data slots by customer premises equipment in a wireless point-to-multipoint communication system.

2. Description of the Related Art

In a point-to-multipoint network, plural customer provided equipment (CPEs) communicate bidirectionally with a base station controller (BSC) in a cell. Several CPEs can share a single channel for communicating with the BSC. The CPEs and the BSC use time division duplexing (TDD) to facilitate the bidirectional aspect of the communication. The CPEs and the BSC use time division multiple access (TDMA) to facilitate sharing of a channel among plural CPEs.

In TDMA, the BSC grants data slots to the CPEs. Because multiple CPEs share a limited number of data slots, the CPEs and the BSC must negotiate data slot assignments through a process called contention.

In contention, CPEs that have upstream data to send to the BSC first send a short request (REQ) message to the BSC. The BSC responds with a grant of a data slot for use by the CPE.

Problems can arise in contention. First, two CPEs might simultaneously try to use a single request slot to request data slots. This situation is called collision. When collisions occur, neither CPE's request message successfully reaches the BSC. Second, if many request slots are defined so as to reduce a number of collisions and so as to facilitate requests by a large number of CPEs, too much of available bandwidth can be used up by contention traffic. As a result, data throughput can be unacceptably decreased.

One technique used in the prior art to reduce contention traffic is called piggybacking. In piggybacking, a CPE first requests a data slot. When the data slot is granted by the BSC, the CPE sends data packets upstream. The CPE attaches a size of its current data backlog to a header for one of the data packets. As a result, whenever the backlog is non-zero, the BSC knows to grant a data slot to the CPE without the CPE having to send a REQ message. Thus, contention traffic is reduced.

Unfortunately, piggybacking is only effective if upstream traffic from the CPE is of the bursty type, so that the CPE needs to make only one contention request per burst. However, some important traffic sources are non-bursty. Examples of non-bursty traffic include traffic generated by online games and voice sources. Even ordinary Internet traffic running over TCP becomes non-bursty when a communication link is in heavy traffic. In the presence of non-bursty traffic, the piggyback scheme breaks down, and an excessive number of contention requests are sent upstream.

SUMMARY OF THE INVENTION

In view of the foregoing, further reducing contention traffic is desirable, especially for non-bursty traffic. The invention addresses this need by using a new state machine to control a contention state for a communication link between a base station controller and customer premises equipment in point-to-multipoint communication. According to the invention, the state machine includes a grant pending absent state in which the customer premises equipment is polled with a unicast request slot. During the grant pending absent state, the customer premises equipment sends no upstream data to the base station controller but can use the unicast request slot to request a data slot for sending upstream data to the base station controller.

By virtue of the grant pending absent state, the customer premises equipment can request a data slot without entering into contention and generating excess contention traffic. After a suitable delay without more data being received to send upstream, the state machine can exit the grant pending absent state. This delay preferably is long enough for receipt of new non-bursty data for a communication, for example 50 ms.

The state machine preferably also includes an idle state in which the customer premises equipment awaits arrival of data packets to send as upstream data to the base station controller, a deferring state in which the customer premises equipment requests grant of a data slot for sending upstream traffic to the base station controller and if necessary defers contending for the data slot so as to avoid collisions with other customer premises equipment, and a grant pending state in which the customer premises equipment awaits and receives grant of the data slot for sending upstream data to the base station controller and sends upstream data to the base station controller after grant of the data slot.

In a preferred embodiment of the invention, the customer premises equipment uses piggybacking to request grant of a next data slot while sending upstream data to the base station controller. Use of piggybacking along with the grant pending absent state has been found to decrease drastically contention traffic.

Preferably, the state machine enters the deferring state upon arrival of data packets to send as upstream data to the base station controller. In the preferred embodiment, the state machine enters the grant pending state after the deferring state, returns to the deferring state if a collision occurs, and remains in the grant pending state when sending upstream data to the base station controller with piggybacking. The state machine preferably enters the grant pending absent state after the customer premises equipment has sent upstream data to the base station controller in the grant pending state.

The state machine according to the invention preferably also includes an unsolicited grant pending state in which the customer premises equipment receives grant of the data slot for sending upstream data to the base station controller and sends upstream data to the base station controller after grant of the data slot, without having requested the data slot. The state machine preferably further includes an unsolicited grant pending absent state in which the customer premises equipment is polled with the unicast request slot. During the unsolicited grant pending absent state, the customer premises equipment sends no upstream data to the base station controller but can use the unicast request slot to request the data slot for sending upstream data to the base station controller. Preferably, the state machine enters the unsolicited grant pending absent state after the customer premises equipment has sent upstream data to the base station controller in the unsolicited grant pending state.

The invention can be embodied in a method for controlling communication using the state machine described above, as well as in software and/or hardware such as a base station controller and/or customer premises equipment that implements the method, and in various other embodiments.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Related Applications

Figure 1:
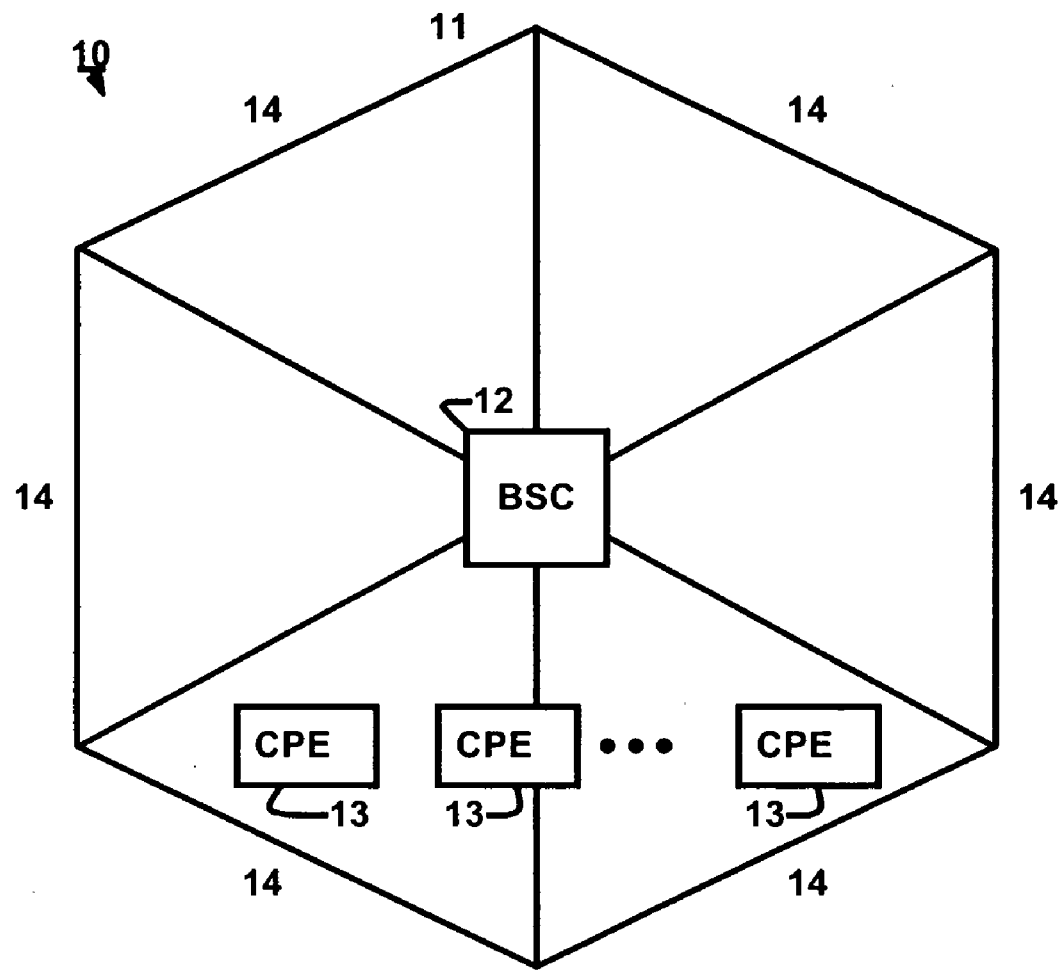
FIG. 1 is a block diagram of a wireless communication system according to the invention in which a base station controller communicates with one or more customer premises equipment according to the invention.

Inventions described herein can be used in conjunction with inventions described in the following documents.

U.S. patent application Ser. No. 09/475,642, Express Mail Mailing No. EL524780018US, filed Dec. 30, 1999 in the names of Reza Majidi-Ahy, Subir Varma, Khuong Ngo, Jean Fuentes and Paul Trong, titled "Adaptive Link Layer for Point to Multipoint Communication System."

U.S. patent application Ser. No. 09/475,716, Express Mail Mailing No. EL524780021 US, filed Dec. 30, 1999 in the names of Reza Majidi-Ahy, Joseph Hakim, and Subir Varma, titled "Integrated Self-Optimizing Multi-Parameter and Multi-Variable Point to Multipoint Communication System."

U.S. patent application Ser. No. 09/540,674, Express Mail Mailing No. EL524781512US, filed Mar. 31, 2000, in the name of Reza Majidi-Ahy, titled "Robust Topology Wireless Communication Using Broadband Access Points."

U.S. patent application Ser. No. 09/604,784, Express Mail Mailing No. EL524781225US, filed Jun. 26, 2000 in the name of Reza Majidi-Ahy, titled "High-Capacity Scalable Integrated Wireless Backhaul for Broadband Access Networks." and U.S. patent application Ser. No. 09/620,826, Express Mail Mailing No. EL524780959US, filed Jul. 21, 2000 in the name of Reza Majidi-Ahy, Joseph Hakim, and Subir Varma, titled "Integrated, Self-Optimizing, Multi-Parameter/Multi-Variable Point-to-Multipoint Communication System."

Each of these documents is hereby incorporated by reference as if fully set forth herein. This application claims priority of each of these documents. These documents are collectively referred to as the "Incorporated Disclosures."

Lexicography

The following terms refer or relate to aspects of the invention as described below. The descriptions of general meanings of these terms are intended to be illustrative, not limiting.

base station controller (BSC)—in general, a device for performing coordination and control for a wireless communication cell. There is no particular requirement that the base station controller must be a single device; in alternative embodiments, the base station controller can include a portion of a single device, a combination of multiple devices, or some hybrid thereof.

communication link—in general, an element for sending information from a sender to a recipient. Although in a preferred embodiment the communication links referred to are generally wireless line of sight point to point communication links, there is no particular requirement that they are so restricted.

customer premises equipment (CPE)—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

The context of the invention is similar to that of the Incorporated Disclosures.

A system using point-to-multipoint communication in a wireless communication system operates as part of a system in which devices coupled to a network (such as a computer network) send messages, route and switch messages, and receive messages. In a preferred embodiment, devices coupled to (and integrated with) the network send, route, and receive these messages as sequences of packets, each of which has a header including delivery information and a payload including data. In a preferred embodiment, packet format conforms to the OSI model, in which an application protocol (layer 5, such as FTP) uses a transport protocol (layer 4, such as TCP), which uses a network protocol (layer 3, such as IP), which uses a media access control (MAC) protocol (layer 2), which uses a physical transport technique (layer 1).

System Elements

FIG. 1 is a block diagram of a wireless communication system according to the invention in which a base station controller communicates with one or more customer premises equipment according to the invention.

System 10 includes wireless communication cell 11 (or a portion thereof), base station controller (BSC) 12, and one or more customer premises equipment (CPE) 13.

Wireless communication cell 11 preferably includes a generally hexagon-shaped region of local surface area, such as might be found in a metropolitan region. Use of generally hexagon-shaped regions is known in the art of wireless communication because hexagonal regions are able to tile a local region with substantially no gaps. Although in a preferred embodiment wireless communication cell 11 includes a generally hexagon-shaped region, no particular requirement exists for using that particular shape; in alternative embodiments, another shape or tiling of the local surface area may be useful.

In FIG. 1, a portion of cell 11 includes a generally triangular-shaped region of local surface area, herein called a "sector." Sectors 14 preferably are disposed so that a set of six sectors 14 combine to form single cell 11. Thus, BSC 12 preferably is disposed at or near one corner of one of sectors 14, while CPEs 13 are disposed within the sectors.

Although the invention is primarily described with regard to interactions that occur between BSC 12 and a single CPE 13 in a single sector 14, substantial applications of the invention exist for interactions across multiple sectors within a cell, and to interaction across sectors in multiple cells. Substantial applications of the invention with regard to multiple sectors, both within single cell and among multiple cells, would be clear to those skilled in the art of wireless communication after perusal of this application, and would not require undue experimentation or further invention.

BSC 12 preferably includes a processor, program and data memory, mass storage, and one or more antennas for sending or receiving information using wireless communication techniques.

Similar to BSC 12, each CPE 13 preferably includes a processor, program and data memory, mass storage, and one or more antennas for sending or receiving information using wireless communication techniques.

In system 10, plural CPEs 13 communicate bidirectionally with BSC 12. Several CPEs 13 can share a single channel for communicating with BSC 12. BSC 12 and CPEs 13 preferably use time division duplexing (TDD) to facilitate the bidirectional aspect of the communication. BSC 12 and CPEs 13 preferably use time division multiple access (TDMA) to facilitate sharing of a channel among plural CPEs 13. In TDMA, BSC 12 grants data slots to CPEs 13. Because multiple CPEs 13 share a limited number of data slots, CPEs 13 and BSC 12 must negotiate data slot assignments through a process called contention.

In contention, CPEs 13 that have upstream data to send to BSC 12 first send a short request (REQ) message to BSC 12. The BSC responds with a grant of a data slot for use by the CPE.

Problems can arise in contention. Plural CPEs 13 might simultaneously try to use a single request slot to request data slots. This situation is called collision. When collisions occur, none of the CPE's request messages successfully reach BSC 12. Those CPEs 13 have to re-send their REQ messages. In order to try to allow REQ traffic to clear, CPEs 13 according to the invention can defer re-sending REQ messages for some period of time when collisions occur.

If many request slots are defined so as to reduce a number of collisions and so as to facilitate requests by a large number of CPEs 13, or if too many REQ messages have to be re-sent, too much of available bandwidth can be used up by contention traffic. As a result, data throughput can be unacceptably decreased.

One technique used in the prior art to reduce contention traffic is called piggybacking. In piggybacking, CPE 13 first requests a data slot. When the data slot is granted by BSC 12, CPE 13 sends data packets upstream. CPE 13 attaches a size of its current data backlog to a header for one of the data packets. As a result, whenever the backlog is non-zero, BSC 12 knows to grant a data slot to CPE 13 without CPE 13 having to send a REQ message. Thus, contention traffic is reduced.

Unfortunately, piggybacking is only effective if upstream traffic from CPE 13 is of the bursty type, so that CPE 13 needs to make only one contention request per burst. However, some important traffic sources are non-bursty. Examples of non-bursty traffic include traffic generated by online games and voice sources. Even ordinary Internet traffic running over TCP becomes non-bursty when a communication link is in heavy traffic. In the presence of non-bursty traffic, the piggyback scheme breaks down, and an excessive number of contention requests are sent upstream.

The invention attempts to reduce contention traffic by using a new state machine to control a contention state for a communication link between a base station controller and customer premises equipment in point-to-multipoint communication. The state can be controlled by the CPE, the BSC, or both.

Figure 2:
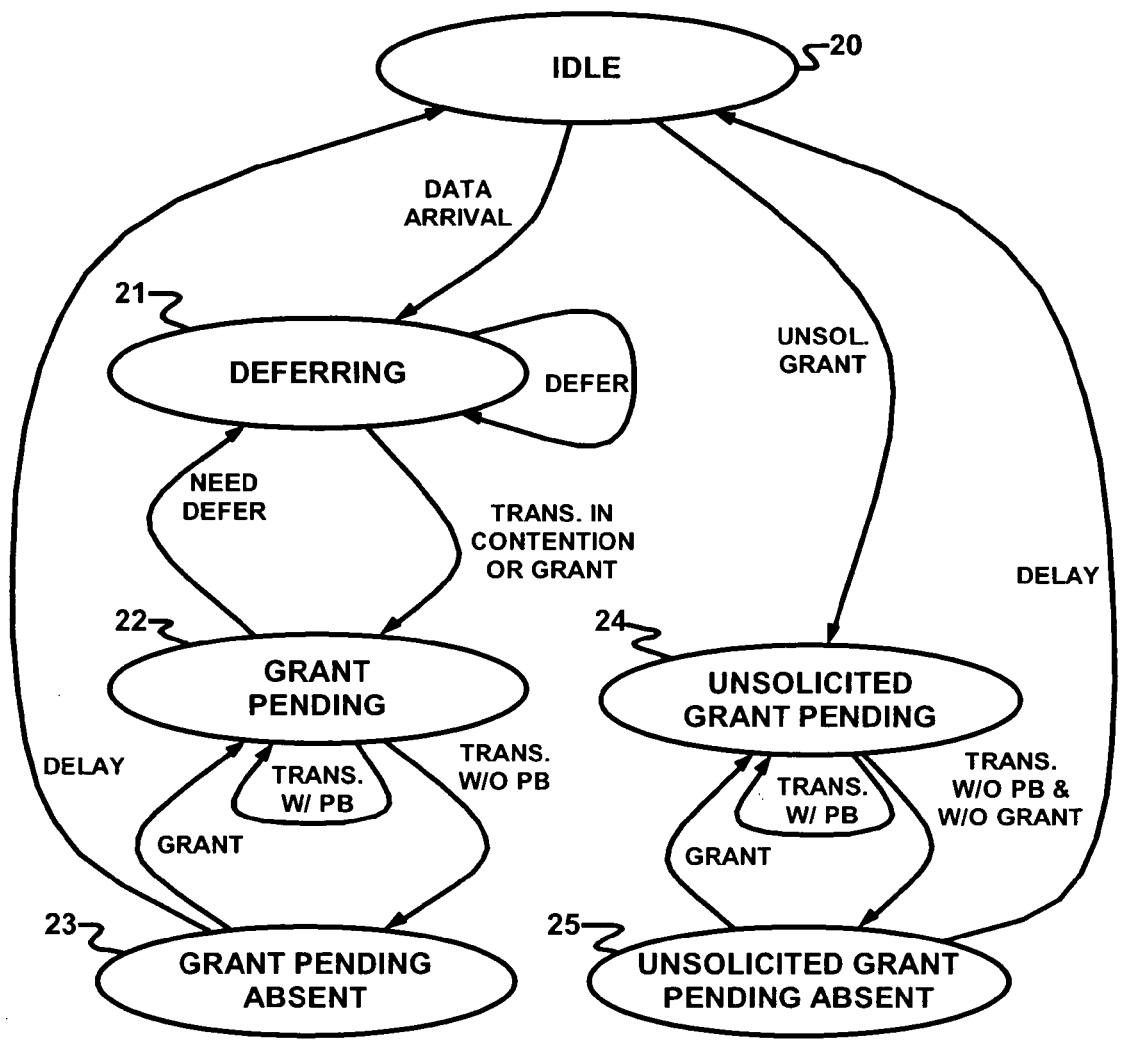
FIG. 2 is a flow chart of a state machine according to the invention.

FIG. 2 is a flow chart of a state machine according to the invention.

Briefly, according to the invention, the state machine includes a grant pending absent state in which the customer premises equipment is polled with a unicast request slot. During the grant pending absent state, the customer premises equipment sends no upstream data to the base station controller but can use the unicast request slot to request a data slot for sending upstream data to the base station controller.

By virtue of the grant pending absent state, the customer premises equipment can request a data slot without entering into contention and generating excess contention traffic. After a suitable delay without more data being received to send upstream, the state machine can exit the grant pending absent state. This delay preferably is long enough for receipt of new non-bursty data for a communication, for example 50 ms.

In more detail, FIG. 2 shows a state machine that includes idle state 20, deferring state 21, grant pending state 22, grant pending absent state 23, unsolicited grant pending state 24, and unsolicited grant pending absent state 25. While the particular states shown in FIG. 2 are representative of a preferred embodiment of the invention, the invention also can utilize state machines that do not include all of these states and/or that include additional states.

Idle state 20 is a waiting state in which the customer premises equipment awaits arrival of data packets to send as upstream data to the base station controller.

Upon arrival of data to be sent as upstream data, the state machine transitions to deferring state 21. The state machine also can transition to unsolicited grant pending state 24 upon receipt of an unsolicited grant of a data slot from BSC 24, as discussed below.

In deferring state 21, CPE 13 sends a REQ message to BSC 12. The state machine then transitions to grant pending state 22. However, if no grant is received from BSC 12 in grant pending state 22 before a timeout, the state machine returns to deferring state 21, as discussed below.

One possible reason for non-receipt of a grant is a collision with another CPE 13. Thus, deferral is needed, and CPE 13 defers sending a new REQ message for a period of time. The CPE then sends the new REQ message. In a preferred embodiment, if another collision occurs, CPE 13 again defers sending another REQ message. This process preferably continues until the REQ messages gets through to BSC 12 (as evidenced by receipt of a grant) or until an error is generated (not shown).

Preferably, each time CPE 13 defers sending a REQ message, the period of deferral roughly doubles, with a random factor included to try to avoid deferring in synch with another CPE. Thus, in deferring state 21, CPE 13 defers contending for a data slot so as to avoid collisions with other customer premises equipment.

In grant pending state 22, CPE 13 awaits and receives grant of the data slot for sending upstream data to the base station controller and sends upstream data to the base station controller after grant of the data slot. However, if a grant is not received before a timeout, the CPE concludes that a collision or some other error has occurred, and the state machine returns to deferring state 21.

Preferably, in grant pending state 22, CPE 13 uses piggybacking to request grant of a next data slot while sending upstream data to BSC 12. When CPE 13 sends the last data in its backlog, that data preferably is sent without piggybacking. The state machine then transitions to grant pending absent state 23 according to the invention.

During grant pending absent state 23, CPE 13 sends no upstream data to BSC 12. No grant is pending because piggybacking was not used in the previous transmission of data to BSC 12 (hence the name of the state). Rather, CPE 13 is periodically (e.g., every 10 ms) polled by BSC 12 with a unicast request slot. CPE 13 can use this unicast request slot to request a data slot for sending upstream data to the base station controller. Thus, if more data is received by CPE 13 to send upstream to BSC 12, CPE 13 can request a data slot without going through contention, thereby reducing contention traffic.

In some circumstances, the reduction in contention traffic can be drastic, for example by an order of magnitude. Of course, the invention is not limited to such circumstances and is not limited to such drastic reductions in contention traffic.

Upon grant of a data slot for sending new data to BSC 12, CPE 13 returns to grant pending state 22.

If no new data is received by CPE 13 before a timeout in grant pending absent state 23, the state machine returns to idle state 20. A timeout of 50 ms has been found to work well.

In some circumstances, BSC 12 can grant a data slot to CPE 13 without the CPE having requested the data slot. For example, if the communication between BSC 12 and CPE 13 is a voice communication, BSC 12 can predict that CPE 13 will need data slots. BSC 12 can grant those data slots to CPE 13 without CPE 13 having to request them. Such a grant is an unsolicited grant.

Accordingly, the preferred embodiment of the state machine according to the invention also includes unsolicited grant pending state 24 and unsolicited grant pending absent state 25. These states correspond to grant pending state 22 and grant pending absent state 23, respectively, with the exception that they are entered when an unsolicited grant occurs.

Thus, in unsolicited grant pending state 24, CPE 13 receives grant of the data slot for sending upstream data to the base station controller and sends upstream data to the base station controller after grant of the data slot, without having requested the data slot.

In unsolicited grant pending absent state 25, CPE 13 is polled with the unicast request slot. During unsolicited grant pending absent state 25, CPE 13 sends no upstream data to BSC 12 but can use the unicast request slot to request the data slot for sending upstream data to BSC 12. The state machine enters unsolicited grant pending absent state 25 after CPE 12 has sent upstream data to BSC 12 in unsolicited grant pending state 24.

Pseudo-code for implementing the preferred embodiment of the invention substantially as discussed above is included in a technical appendix to this application.

Alternative Embodiments

The invention can be embodied in a method for controlling communication using the state machine described above, as well as in software and/or hardware such as a BSC and/or a CPE that implements the method, and in various other embodiments.

In the preceding description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

Furthermore, although preferred embodiments of the invention are disclosed herein, many variations are possible which remain within the content, scope and spirit of the invention, and these variations would become clear to those skilled in the art after perusal of this application.

What is claimed is:

1. A method of controlling a contention state for a communication link between a base station controller and customer premises equipment in point-to-multipoint communication, comprising the step of:
controlling the contention state using a state machine with a plurality of states, the state machine including a grant pending absent state in which the customer premises equipment is polled with a unicast request slot, wherein during the grant pending absent state, the customer premises equipment sends no upstream data to the base station controller but can use the unicast request slot to request a data slot for sending upstream data to the base station controller, and a grant pending state in which the customer premises equipment awaits and receives grant of the data slot for sending upstream data to the base station controller and sends upstream data to the base station controller after grant of the data slot, wherein the state machine enters the grant pending absent state after the customer premises equipment has sent upstream data to the base station controller in the grant pending state.

2. A method as in claim 1, wherein the state machine further includes an idle state in which the customer premises equipment awaits arrival of data packets to send as upstream data to the base station controller.

3. A method as in claim 2, wherein the state machine further includes a deferring state in which the customer premises equipment requests grant of a data slot for sending upstream traffic to the base station controller and if necessary defers contending for the data slot so as to avoid collisions with other customer premises equipment.

4. A method as in claim 3, wherein in the grant pending state, the customer premises equipment uses piggybacking to request grant of a next data slot while sending upstream data to the base station controller.

5. A method as in claim 4, wherein the state machine enters the deferring state upon arrival of data packets to send as upstream data to the base station controller,
wherein the state machine enters the grant pending state after the deferring state, returns to the deferring state if a collision occurs, and remains in the grant pending state when sending upstream data to the base station controller with piggybacking.

6. A method as in claim 5, wherein the state machine further includes an unsolicited grant pending state in which the customer premises equipment receives grant of the data slot for sending upstream data to the base station controller and sends upstream data to the base station controller after grant of the data slot, without having requested the data slot.

7. A method as in claim 6, wherein the state machine further includes an unsolicited grant pending absent state in which the customer premises equipment is polled with the unicast request slot,
wherein during the unsolicited grant pending absent state, the customer premises equipment sends no upstream data to the base station controller but can use the unicast request slot to request the data slot for sending upstream data to the base station controller, and
wherein the state machine enters the unsolicited grant pending absent state after the customer premises equipment has sent upstream data to the base station controller in the unsolicited grant pending state.

8. Customer premises equipment that communicates over a communication link with a base station controller in point-to-multipoint communication, comprising:
a transceiver, and
a controller that controls a contention state for communicating over the communication link via the transceiver, the controller using a state machine with a plurality of states for controlling the contention state, the state machine including a grant pending absent state in which the customer premises equipment is polled with a unicast request slot, wherein during the grant pending absent state, the customer premises equipment sends no upstream data to the base station controller but can use the unicast request slot to request a data slot for sending upstream data to the base station controller, and a grant pending state in which the customer premises equipment awaits and receives grant of the data slot for sending upstream data to the base station controller and sends upstream data to the base station controller after grant of the data slot, and wherein the state machine enters the grant pending absent state after the customer premises equipment has sent upstream data to the base station controller in the grant pending state.

9. Customer premises equipment as in claim 8, wherein the state machine further includes an idle state in which the customer premises equipment awaits arrival of data packets to send as upstream data to the base station controller.

10. Customer premises equipment as in claim 9, wherein the state machine further includes a deferring state in which the customer premises equipment requests grant of a data slot for sending upstream traffic to the base station controller and if necessary defers contending for the data slot so as to avoid collisions with other customer premises equipment.

11. Customer premises equipment as in claim 10, wherein in the grant pending state, the customer premises equipment uses piggybacking to request grant of a next data slot while sending upstream data to the base station controller.

12. Customer premises equipment as in claim 10, wherein the state machine enters the deferring state upon arrival of data packets to send as upstream data to the base station controller,
wherein the state machine enters the grant pending state after the deferring state, returns to the deferring state if a collision occurs, and remains in the grant pending state when sending upstream data to the base station controller with piggybacking.

13. Customer premises equipment as in claim 12, wherein the state machine further includes an unsolicited grant pending state in which the customer premises equipment receives grant of the data slot for sending upstream data to the base station controller and sends upstream data to the base station controller after grant of the data slot, without having requested the data slot.

14. Customer premises equipment as in claim 13, wherein the state machine further includes an unsolicited grant pending absent state in which the customer premises equipment is polled with the unicast request slot,
wherein during the unsolicited grant pending absent state, the customer premises equipment sends no upstream data to the base station controller but can use the unicast request slot to request the data slot for sending upstream data to the base station controller, and
wherein the state machine enters the unsolicited grant pending absent state after the customer premises equipment has sent upstream data to the base station controller in the unsolicited grant pending state.

15. A method as in claim 1, wherein the plurality of states comprises states in which the customer premises equipment is not polled with the unicast request slot.

16. Customer premises equipment as in claim 8, wherein the plurality of states comprises states in which the customer premises equipment is not polled with the unicast request slot.

* * * * *